United States Patent [19]

De Seversky

[11] 3,856,476

[45] Dec. 24, 1974

[54] HIGH VELOCITY WET ELECTROSTATIC PRECIPITATION FOR REMOVING GASEOUS AND PARTICULATE CONTAMINANTS

[75] Inventor: Alexander P. De Seversky, New York, N.Y.

[73] Assignee: Seversky Electronatom Corporation, New York, N.Y.

[22] Filed: Jan. 31, 1972

[21] Appl. No.: 222,227

Related U.S. Application Data

[63] Continuation-in-part of Ser. No. 723,810, April 24, 1968.

[52] U.S. Cl. ............... 23/284, 23/255 E, 23/277 C, 23/288 E, 23/288 F, 55/5, 55/119, 55/128, 55/134, 55/154, 55/390, 55/DIG. 38, 74/29, 250/532, 261/112, 261/DIG. 54, 423/215.5, 423/237, 423/240, 423/242

[51] Int. Cl. ......... B03c 3/01, B03c 3/16, B03c 3/78

[58] Field of Search ......... 55/5, 122, 134, 135, 154, 55/DIG. 38, 128, 129, 138, 146; 23/284, 255 E, 277 C, 232 E, 254 E, 288 R, 288 E, 288 F; 74/29, 30; 423/237, 240, 242, 215, 210; 250/532

[56] References Cited

UNITED STATES PATENTS

| | | | |
|---|---|---|---|
| 1,022,012 | 4/1912 | Whitney | 317/262 |
| 1,284,167 | 11/1918 | Welch | 55/122 X |
| 1,291,745 | 1/1919 | Bradley | 55/5 X |
| 1,995,293 | 3/1935 | Clark | 243/535 |
| 2,192,249 | 3/1940 | White | 55/119 X |
| 2,324,821 | 7/1943 | Campbell | 23/232 E X |
| 2,762,568 | 9/1956 | Sullivan | 23/254 E |
| 2,879,862 | 3/1959 | Burden, Jr. | 23/277 C |
| 2,897,062 | 7/1959 | Minarik | 261/DIG. 54 |
| 3,026,184 | 3/1962 | Karasek | 23/255 E |
| 3,237,399 | 3/1966 | Hamblin et al. | 23/277 C X |
| 3,315,444 | 4/1967 | De Seversky | 55/119 X |
| 3,468,634 | 9/1969 | Pauletta | 23/288 |
| 3,478,579 | 11/1969 | Whitmore et al. | 73/116 |
| 3,520,662 | 7/1970 | Marks | 23/284 |
| 3,526,081 | 9/1970 | Kusters | 55/154 X |
| 3,607,120 | 9/1971 | Nesbitt et al. | 110/8 A X |

FOREIGN PATENTS OR APPLICATIONS

| | | | |
|---|---|---|---|
| 112,153 | 12/1917 | Great Britain | 55/5 |
| 463,504 | 4/1937 | Great Britain | 55/150 |
| 932,895 | 7/1963 | Great Britain | 55/134 |
| 1,189,192 | 4/1970 | Great Britain | 55/120 |
| 425,593 | 4/1911 | France | 55/DIG. 38 |
| 834,650 | 8/1938 | France | 21/54 |

OTHER PUBLICATIONS

In re De Seversky, 177 USPQ 144–147, No. 8816, Decided Mar. 8, 1973, Patent Trademark and Copyright Weekly Reports.

*Primary Examiner*—Dennis E. Talbert, Jr.

[57] ABSTRACT

A wet electrostatic precipitator including at least one annular gas passage defined by concentrically arranged collector tubes have liquid distributors mounted thereabove to produce downwardly-flowing uniform liquid films on the walls of the passage. A discharge electrode structure is disposed in the annular passage, a high voltage being applied between the electrode structure and the liquid films on the collector walls to create an electrostatic field causing ionized particulates in a gaseous stream conveyed upwardly through the passage to migrate toward the films to be carried downwardly thereby for disposal. Incoming contaminated gas at high velocity is fed into a reagent chamber communicating with a Venturi inlet leading to the annular gas passage, the chamber containing one or more manifold rings provided with an array of jet nozzles for spraying a reagent into the chamber and Venturi inlet to intermingle and react with chemical contaminants in the inflowing gas to produce reaction products in particulate form which are precipitable in the passage. The axial positions of the rings within the reaction chamber relative to the Venturi inlet are adjustable in order to optimize the reaction with the gaseous or chemical contaminants in the incoming stream. In addition, a ring of catalytic material may be included in the reaction chamber to enhance the chemical interation.

17 Claims, 15 Drawing Figures

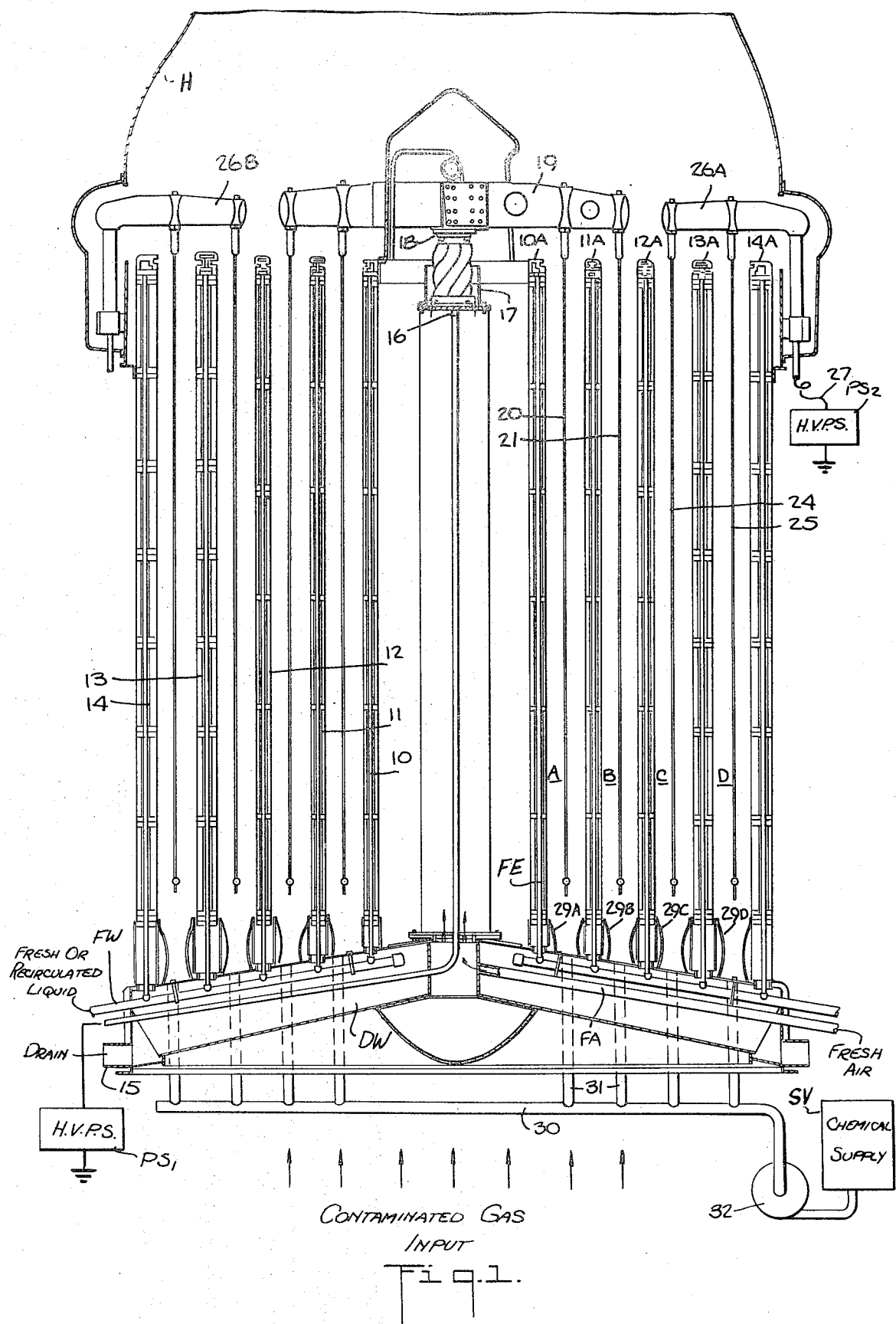

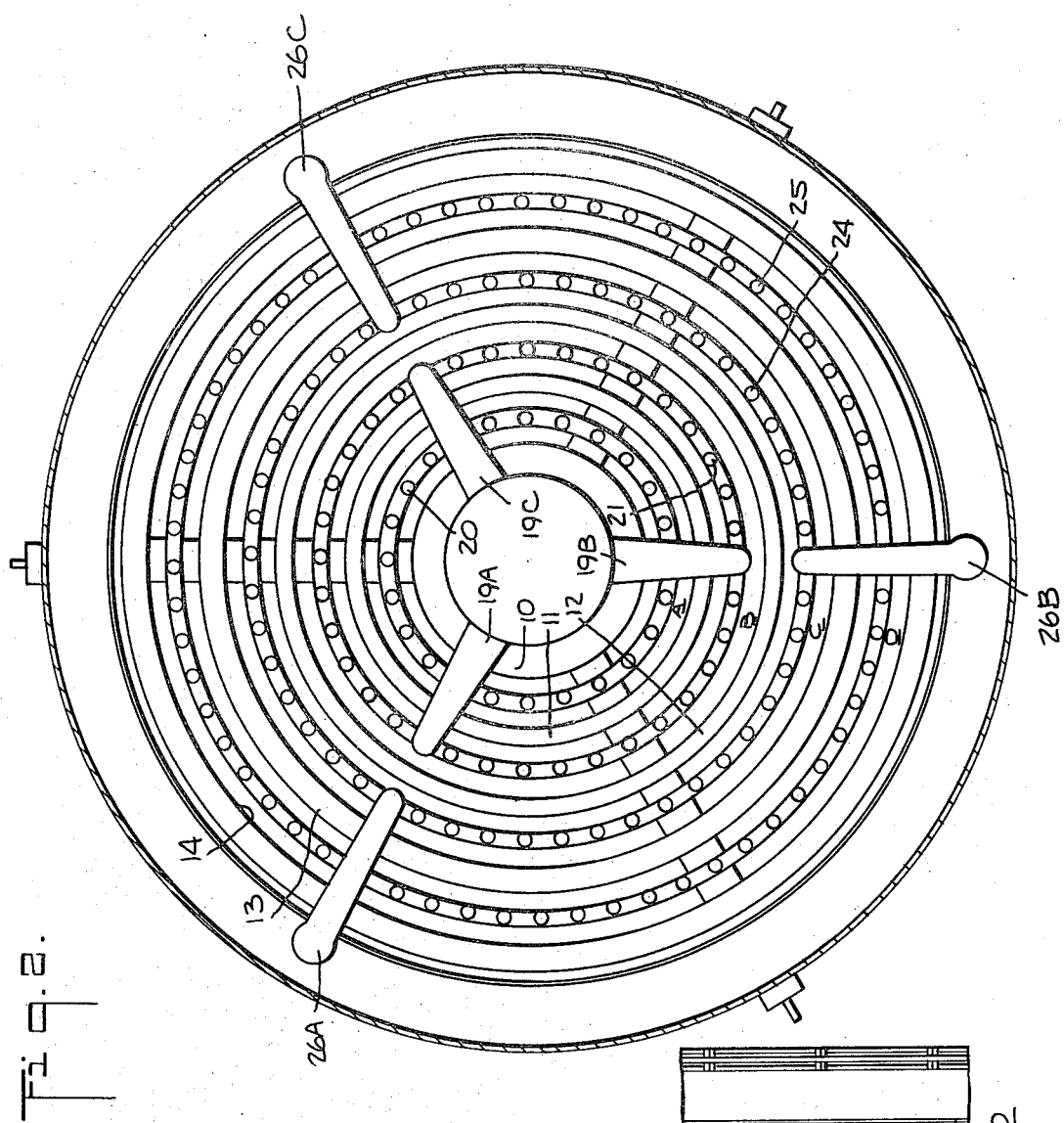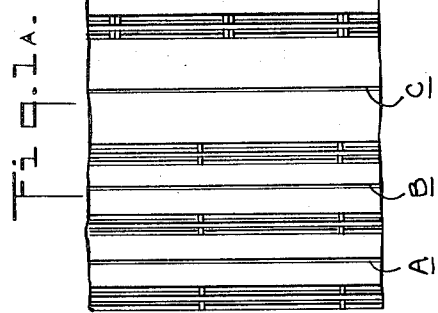

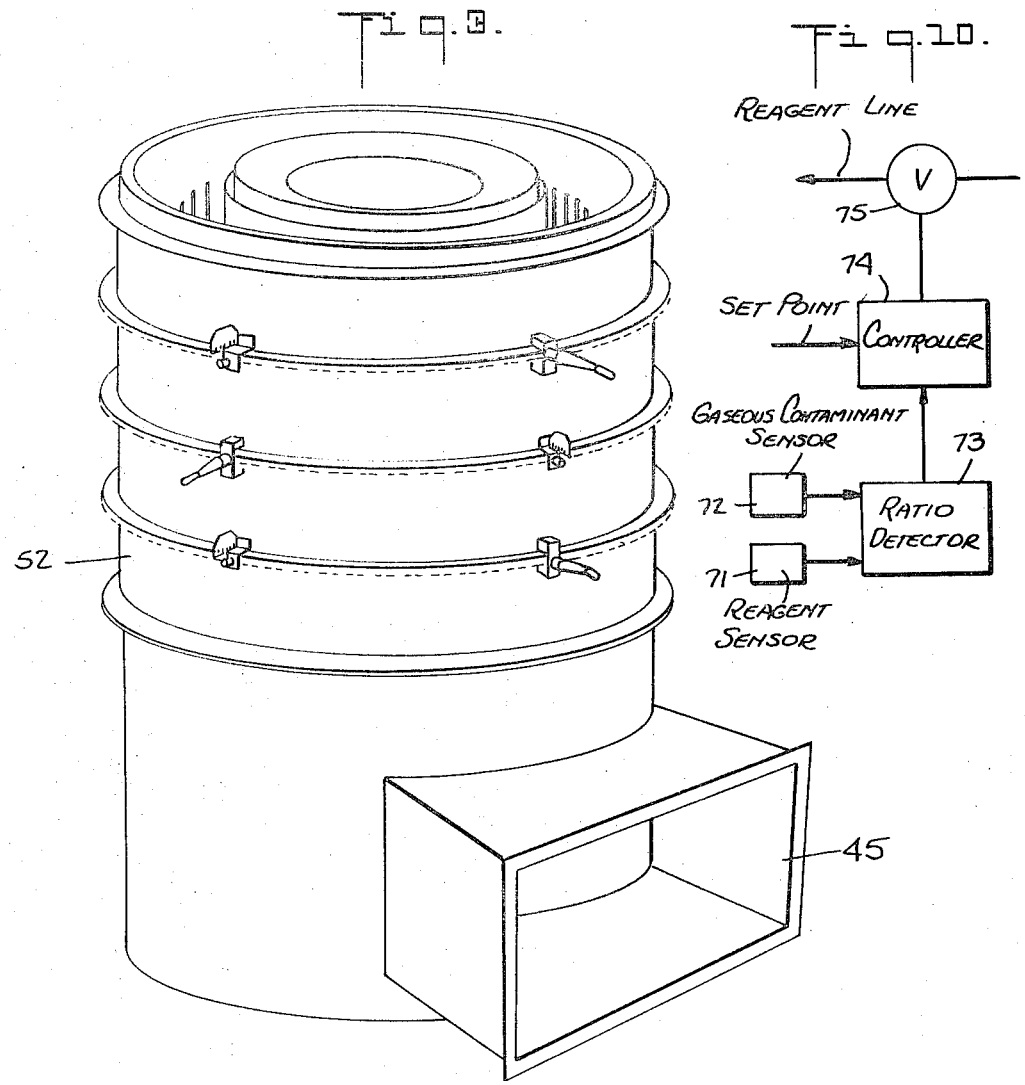
Fig. 8.
Fig. 10.
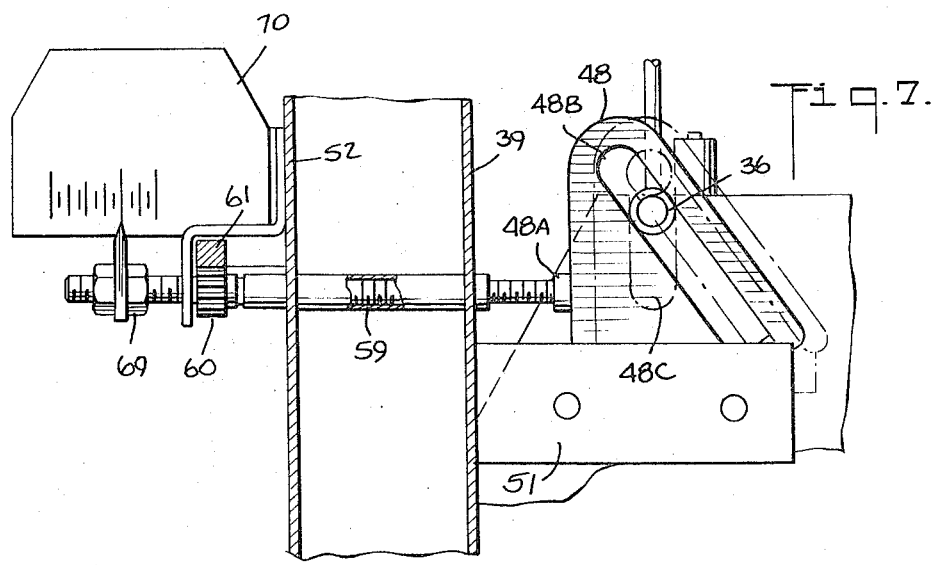
Fig. 7.

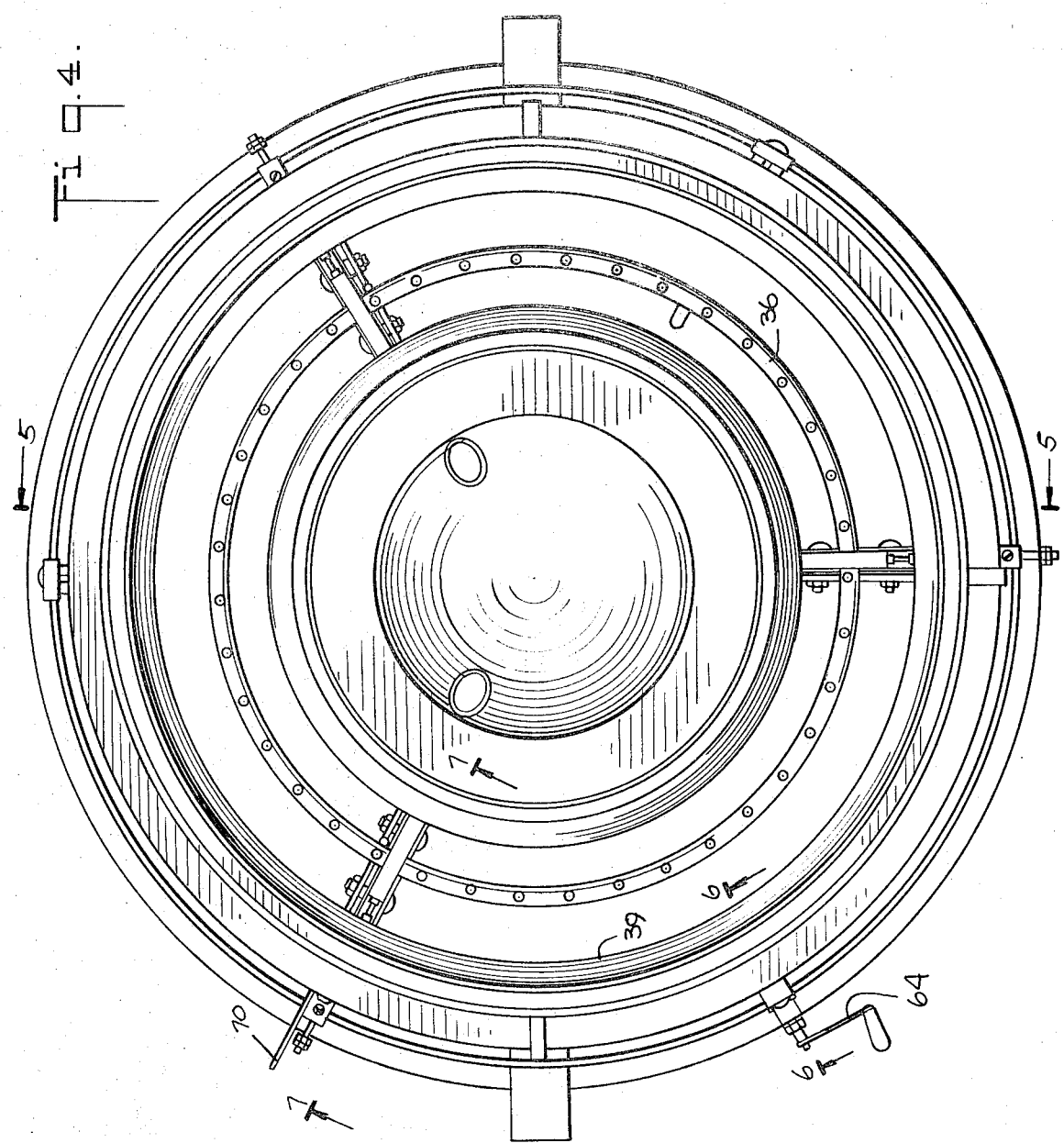

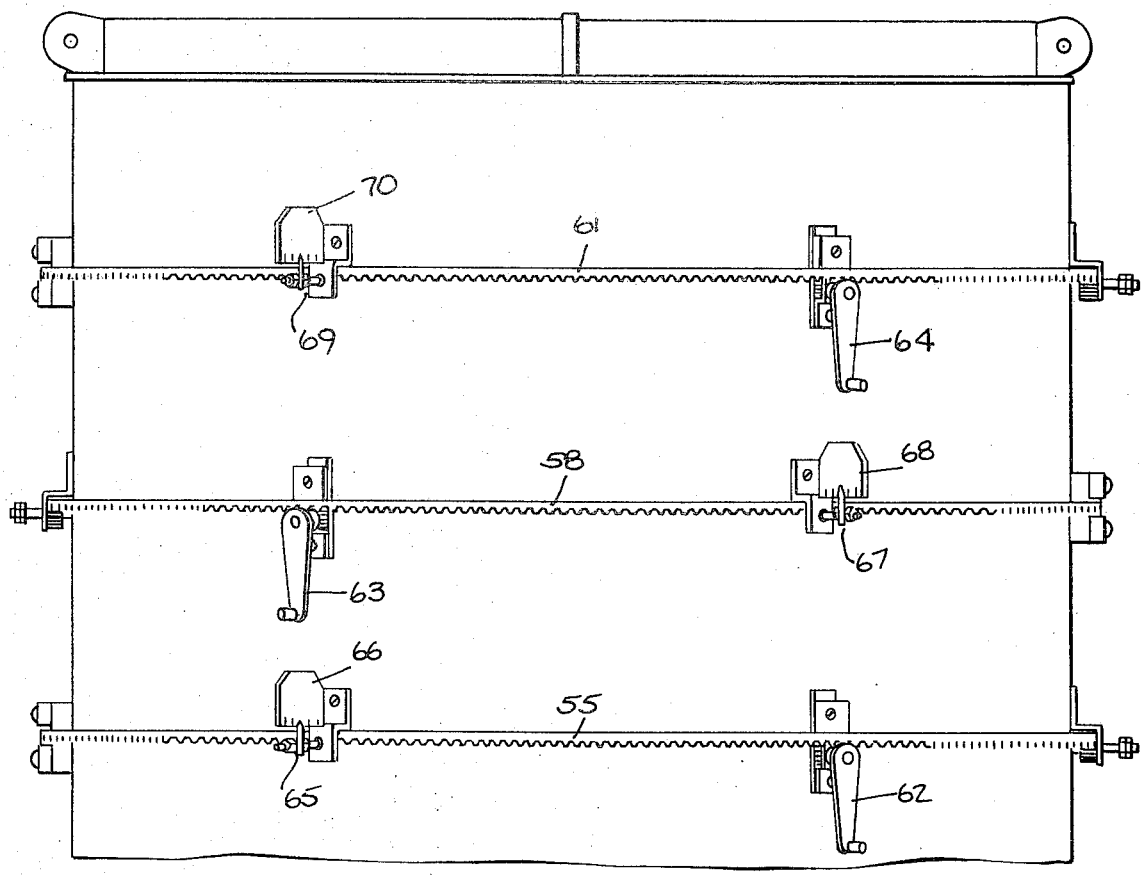
Fig. 9.
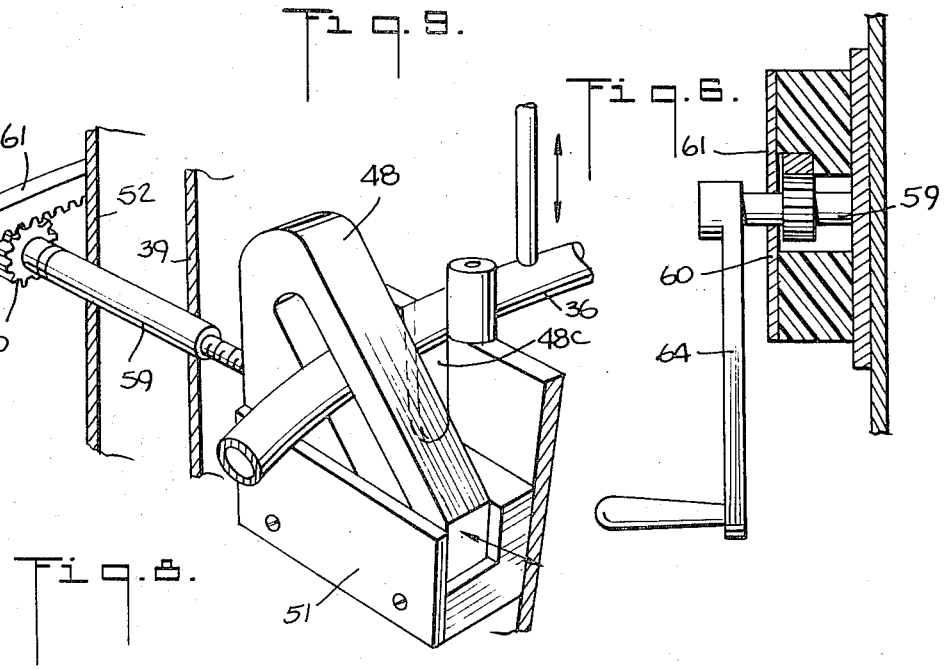
Fig. 8.
Fig. 6.

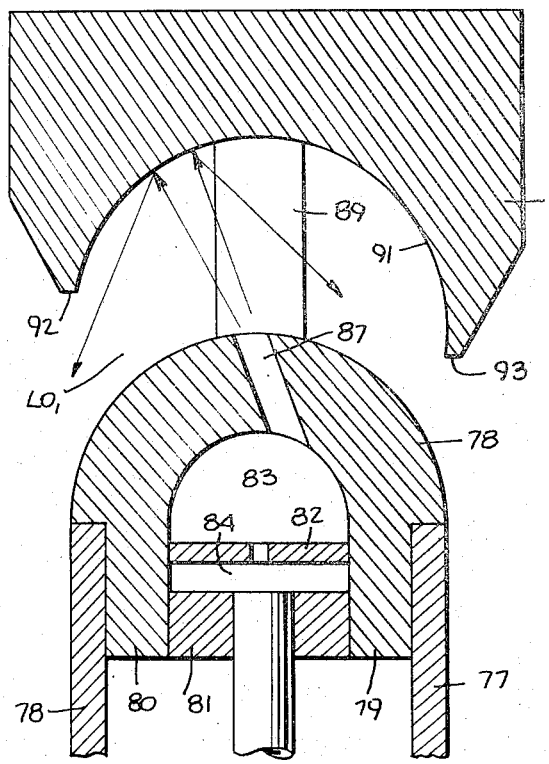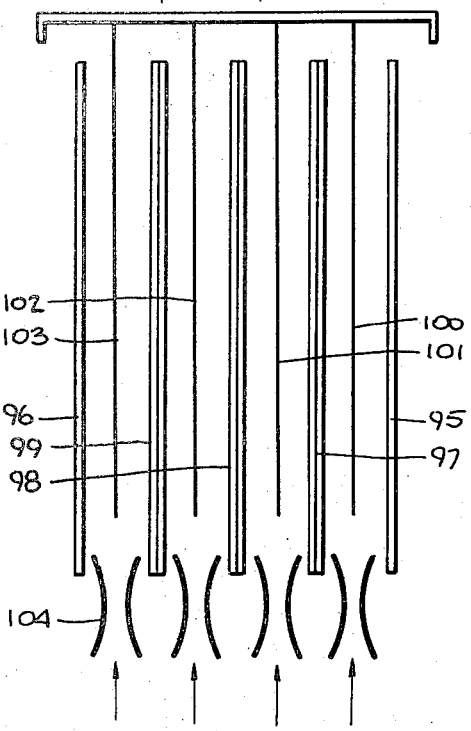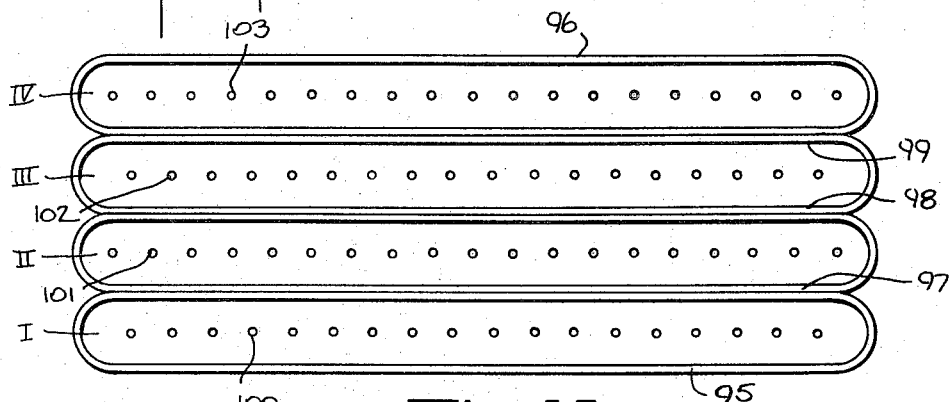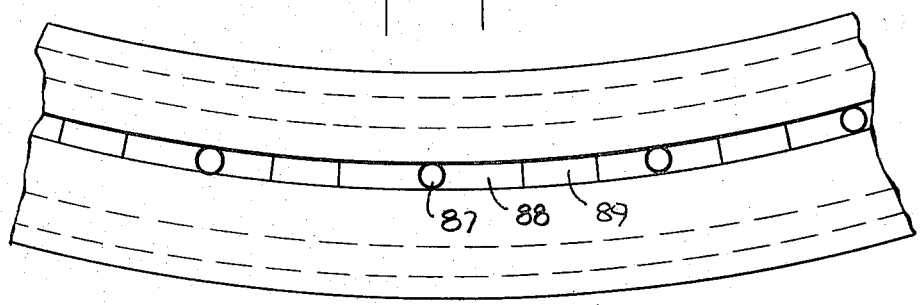

3,856,476

HIGH VELOCITY WET ELECTROSTATIC PRECIPITATION FOR REMOVING GASEOUS AND PARTICULATE CONTAMINANTS

RELATED APPLICATION

This application is a continuation-in-part of my co-pending application, Ser. No. 723,810, filed Apr. 24, 1968.

BACKGROUND OF THE INVENTION

My invention relates generally to wet electrostatic precipitators for extracting particles of a solid or semi-solid nature, as well as toxic gaseous components, from air or other contaminated gaseous media, and more particularly to a multi-concentric wet electrostatic precipitator having structural flexibility to provide units of large operating capacities for such uses as power plants, metallurgical, chemical industries, municipal incineration and the like. The nature of these units is such that they may be miniaturized to provide pollution control for low volume emissions for small plants, apartment house incinerators, individual fireplaces, etc.

For purposes of reducing atmospheric pollution, it is known to use electrostatic precipitators wherein impurity-laden gases, such as those issuing from a heating furnace, incinerator or an industrial outlet, are conveyed through a charged enclosure where they are subjected to an electrostatic field ionizing the particles and causing their migration from a discharge electrode to a collecting electrode which may be flat or tubular, thereby extracting the particles from the gas stream.

In my prior U.S. Pat. Nos. 2,937,709, 3,053,029, 3,238,702 and 3,315,444, there are disclosed wet electrostatic precipitators wherein the collecting surfaces are constituted by uniform films of liquid which carry away the particles. Precipitators of the type disclosed in my patents are to a large extent inherently self-cleaning in contradistinction to dry precipitators which must be shut down to permit scraping of agglomerated particles from the dry collector walls. In dry precipitators, means must be provided for rapping vibrator or otherwise shaking the structure to loosen the accumulated particles from the electrodes. This invariably causes re-entrainment of the particles into the gas stream. Wet precipitators on the other hand, being maintenance free, are particularly suited for precipitating complex and adhesive particulate matter of the type encountered in some chemical and industrial plants as well as in apartment house and mincipal incinerators.

In the above-identified prior patents, there is disclosed a wet precipitator constituted by concentrically-arranged inner and outer tubes which define a vertically-disposed annular gaseous passage, downwardly-flowing liquid films being produced on those surfaces of the tubes which line the passage. A high voltage is applied between a discharge-electrode structure mounted in the passage and the liquid films which function effectively as collectors, whereby contaminants in solid or semi-solid particulate form such as the aerosols in a gaseous stream conveyed through the passage, are ionized and caused to migrate toward the collector films to be carried downwardly thereby for disposal. Thus the gas emerging from the upper end of the passage is clean and may safely be discharged into the atmosphere.

When one seeks to enlarge the operating capacity of a wet precipitator of the concentric cylinder type, this cannot be done simply by increasing the diameters of the inner and outer tubes, for while an increase in the cross-sectional radial dimension of the annular passage will enlarge the over-all volume thereof and hence the operating requirements therefore beyond optimum values. The requisite voltage to effect electrostatic precipitation is determined by the spacing or air-gap between the discharge electrode and the collector films, and if this spacing, which is the radial dimensions of the annular passage, is increased to enlarge the capacity of the system, the voltage requirements may at the same time be raised well beyond practical limits.

In my above-identified co-pending application, a precipitator of enlarged capacity is created by annular passages all having the same radial dimensions for the same operating potential. These annular passages are defined by a series of vertically disposed, concentrically-arranged tubes of progressively increasing diameter, the inner and outer surfaces of adjacent tubes in the series thereof forming the linings of the annular flow passages and having downwardly-flowing, uniform liquid films produced thereon.

My invention, however, is not limited to a structure in which annular passages have the same radial dimensions. If desirable, radial dimensions can vary; however, in such a case, the electrical potential applied to separate and corresponding discharge electrodes will have to vary accordingly.

In a precipitator of the type disclosed in my co-pending application, because the contaminants are carried away by thin uniform liquid films, the device is capable of functioning simultaneously as a chemical reactor to create valuable compounds that can be extracted as by-products of air pollution control. The liquids may be acid, alkaline or possess any other chemical properties, so that extracted particulate matter which impinges in the liquid film can produce a desirable compound.

Furthermore, because gases are moving through the precipitator at comparatively high velocities, vapor, mists, aerosols or reagents in other forms, wet or dry, may be injected in the gas stream at the Venturi throat, changing the nature of the gases and, in some instances, converting them into particulate matter which can be precipitated to combine into desirable chemical compounds once they impinge on the liquid films of the collectors. For example, magnesium oxide powder in submicronic form blown through the jets combines with $So_2$ to to become magnesium silfide.

In a precipitator of the type in which reagents are introduced to convert gaseous or chemical contaminants in the stream being treated into reaction products in a form which may be precipitated, in order for the system to operate efficiently, it is important that the reagents be introduced so that they intermingle and react with substantially all of the contaminants in the stream, otherwise contaminants will be discharged into the atmosphere, resulting in pollution.

Not only is it important that reagents be introduced in a sufficient volume and in a manner resulting in full treatment of all contaminants, but it is imperative that the volume of the reagent fed into the precipitator system not exceed that required thereby, for therewise the surplus reagent will pass through the system and be discharged into the atmosphere. This results not only in wasting of the reagent, but in atmospheric pollution by the reagent.

SUMMARY OF THE INVENTION

The main purpose of the present invention is to provide an improved wet electrostatic precipitator having at least one annular passage defined by concentrically-arranged inner and outer collector tubes, wherein an incoming stream to be treated is fed through a reaction chamber communicating with a Venturi inlet leading to the precipitator passage, reagents being dispersed in the reaction chamber to intermingle and react with gaseous and chemical contaminants contained in the stream.

A significant feature of the invention resides in an arrangement for optimizing the reaction between the reagent and the contaminants in the reaction chamber whereby substantially all of the contaminants are treated.

More specifically, it is an object of this invention to provide a precipitator of the above-described type in which one or more reagents are introduced into the reaction chamber by means of manifold rings, each having an array of jet nozzles uniformly dispersing the reagent in the reaction chamber.

Also an object of the invention is to provide means in a reaction chamber to adjust the axial position of the reagent rings relative to the Venturi inlet to conform the inflow of reagent to the existing concentration and velocity of the gaseous contaminant.

Still another object of the invention is to provide a process control system for sensing the existing ratio between the reagent in the reaction chamber and the gaseous or chemical contaminant therein to produce a control signal for varying the flow of reagent so that the influx thereof is no more than sufficient to react with and fully treat the gaseous contaminant.

Briefly stated, these objects are attained in a wet electrostatic precipitator formed by a collector assembly and an inlet structure therefor, the assembly including at least one annular gas passage defined by concentrically-arranged collector tubes having liquid distributors mounted thereon to produce downwardly-flowing uniform liquid films on the walls lining the passage, discharge electrodes being disposed in the annular passage to create an electrostatic field therein to cause particles in the gaseous stream conveyed upwardly through the passage to migrate toward the liquid films to be carried downwardly thereby for disposal.

In the inlet structure, an incoming contaminated stream having gaseous chemical components which are non-precipitable as well as precipitable particulate components is fed into a reaction chamber communicating with a Venturi inlet leading to the annular passage in the precipitator assembly.

Adjustably mounted in the inlet structure are one or more manifold rings provided with an array of jet nozzles for spraying an appropriate reagent into the chamber and Venturi inlet to intermingle and react with the non-precipitable contaminants to produce precipitable reaction products, or to change the composition of precipitable matter. The axial position of the rings is adjustable relative to the Venturi inlet to optimize the reaction with the gaseous or chemical contaminants in the incoming stream. In addition, a ring of catalytic material may be included in the inlet structure to promote the chemical reaction therein.

OUTLINE OF THE DRAWINGS

For a better understanding of the invention, as well as other objects and further features thereof, reference is made to the following detailed description to be read in conjunction with the accompanying drawings, wherin:

FIG. 1 is an elevational view of one preferred embodiment of a wet electrostatic precipitator in accordance with the invention, the view being in section and being partially schematic in form;

FIG. 1A is a modified form of precipitator;

FIG. 2 is a plan view of the precipitator shown in FIG. 1;

FIG. 3 is a perspective view of an inlet structure in accordance with the invention including a reaction chamber and a Venturi inlet for feeding a contaminated gas to be processed into a wet electrostatic precipitator;

FIG. 4 is a plan view of the inlet structure;

FIG. 6 is a section taken in the plane indicated by line 6—6 in FIG. 4;

FIG. 7 is a section taken in the plane indicated by line 7—7 in FIG. 4;

FIG. 8 is a perspective view illustrative of the operation of the manifold-ring adjusting mechanism;

FIG. 9 is an elevational view of the inlet structure;

FIG. 10 is a block diagram of an electronic controller for automatically adjusting the amount of reagent fed into the inlet structure for the precipitator;

FIG. 11 is a transverse section taken through a preferred form of water distributor;

FIG. 12 is a plan view of a portion of the lower ring of the distributor;

FIG. 13 is a plan view of another embodiment of a wet precipitator; and

FIG. 14 is a section therethrough.

GENERAL DESCRIPTION OF THE INVENTION

Figure 5:
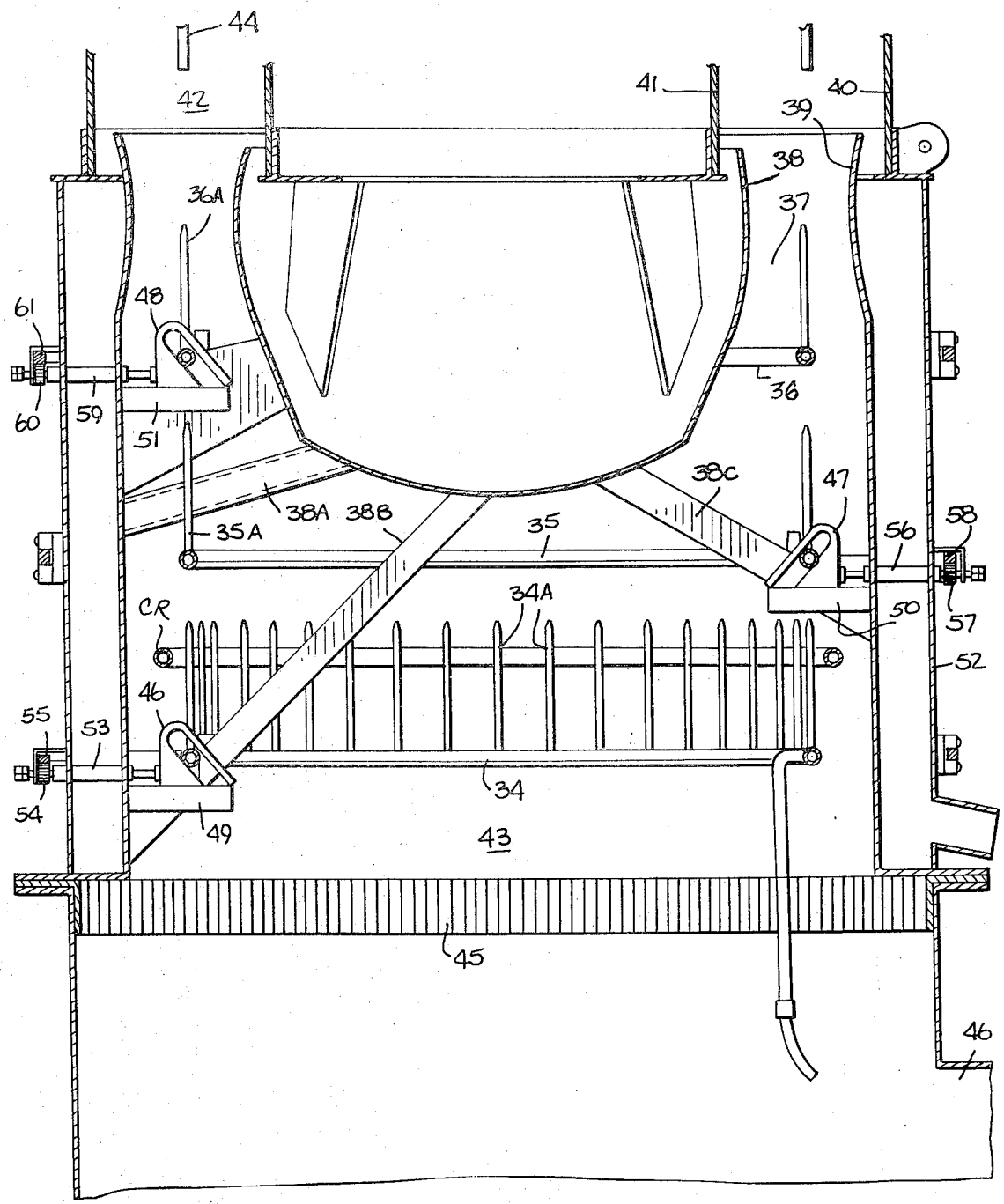
FIG. 5 is a longitudinal section of the inlet structure taken in plane indicated by line 5—5 in FIG. 4.

Referring to the drawings and more particularly to FIG. 1 and 2, there is shown one preferred embodiment of a wet precipitator of multi-concentric construction comprising five concentrically disposed tubes 10, 11, 12, 13 and 14, of progressively increasing diameter, which define four concentric annular gas channels or passages A, B, C and D having the same radial dimensions or cross-sectional widths.

The tubes are vertically arranged, the inlet for the gaseous stream to be purified being at the lower end, and the gas outlet being at the top end of the tubes. While a system with four concentric channels is shown, it will be appreciated that the system may be enlarged to include any number of concentric channels.

In practice, the arrangement may be made such as to provide concentric channels all having the same radial dimensions as shown in FIG. 1, in which event, the operating voltage is made the same for all channels; or the system may be arranged with concentric channels, some of which have one radial dimension and the others another radial dimension, as shown in FIG. 1A, in which event those channels A' and B' having a first radial dimension, all have the same operating voltage appropriate to the channel dimension, and those channels C' and D' having a second radial dimension, also all have another operating voltage, but at a level appropriate thereto; thus channels having a larger radial dimension will be operated at a higher voltage.

The concentric arrangement and the relatively high velocity at which the gas is processed, enormously increases the operating capacity of the system without waste of space. It therefore becomes possible, as compared to a conventional precipitator of the same capacity, to provide a far more compact unit, requiring a smaller installation area. The compact unit, which performs the same function as the conventional unit, is also considerably less expensive.

The following factors in a wet precipitator in accordance with the invention, taken together, make it possible to operate the precipitator at exceptionally high velocities, so that a comparatively small unit has a very high operating capacity:

A. The gaseous stream moves in a smooth column in parallel relation to the discharge electrodes in the flow passages, rather than at right angles, thereto as in standard precipitators, thereby avoiding vortices and turbulence in the stream.

B. Reintrainment of the liquid films on the collector surfaces is prevented in the lower regions of these surfaces by the expanding gas produced by the Venturi action and in the upper regions by the special liquid distributors, to be later described.

In practice, the velocity of the stream may be from 20 to 50 feet per second and higher, depending on structural considerations. This rate is much higher than has heretofore been feasible. It is also to be borne in mind that in the present system, a high velocity stream is essential to an effective Venturi action, for if the velocity is low, a Venturi effect will not be experienced and gas expansion at the output of the Venturi will not result, such expansion being necessary to force the liquid films against the collector walls.

Tubes 10, 11, 12, 13 and 14 are preferably of double-walled or hollow construction to provide space for plumbing in order to supply liquid to the tubes. A set of conduits FE feeds fresh water or whatever other liquid is used in the system through the interior of the tubes to the upper end thereof to distributors 10A, 11A, 12A, 13A and 14A, which are mounted slightly above the upper ends of the collector tubes and are adapted to cause the liquid fed thereto to flow down the walls of the tubes, whereby the annular passages are lined with liquid films.

In practice, the liquid distributors may be fed by supply lines which do not go through the interior of the collector tubes, but which come from above the water distributors, in which event the collector tubes need not be of hollow construction.

The downwardly-flowing liquid on these collector surfaces runs into a conduit DW which carries contaminated liquid into a drain through pipe 15 or suitable vessel if it contains valuable by-products. Thus, the tube surfaces which line passages A, B, C and D, have fluid films produced thereon which acts as collector electrodes.

It is to be noted that fresh liquid conduits FW run into conduit DW for the contaminated liquid. Also extending through conduit DW is a conduit FA which supplies filtered air to the input terminal 16 of scavenging assembly 17 of the discharge electrode support 18, to prevent its contamination by dirt or other foreign matter. This scavenging assembly may make use of aerodynamic vanes of the type disclosed in my prior U.S. Pat. No. 3,238,702, and in particular, FIGS. 4, 5 and 6 in said patent. The arrangement is such that air is cyclonically directed and forced against all scale and dirt therefrom to maintain the insulating qualities thereof.

On top of electrode support 18, there is attached a conductive spider 19 formed by three horizontal cantilever arms 19A, 19B and 19C, from which are suspended two cylindrical cages or discharge-electrode structures. Discharge-electrode structure 20 is disposed in channel A, and discharge-electrode structure 21 is disposed in channel B.

A high voltage of suitable magnitude is supplied by a d-c power supply $PS_1$. One side of the supply is connected through a cable to input terminal 16 which is electrically coupled to the conductive spider 19 and hence to the discharge-electrode structures. The other side of power supply $PS_1$ is grounded, as is the liquid supply fed to the collector tubes. Hence an electrostatic field is established between the liquid films which line the annular passages A and B and the associated discharge-electrode structures 20 and 21. Passages C and D are provided with discharge electrode cages 24 and 25 supported by radial arms 26A, 26B and 26C and connected by a line 27 to a high voltage supply $PS_2$.

Contaminated gas is introduced through the bottom end of passages A, B, C and D through radial Venturi slots 29A, 29B, 29C and 29D, respectively, the gas being subjected to the high-voltage electrostatic field which causes solid and semi-solid particles in the gaseous stream to become ionized and to migrate to the liquid collecting films on the surfaces of the tubes lining the passages. These liquid films carry the extracted matter down conduit DW into a drain or vessel.

Because of the relatively high velocity of the gas stream, the Venturi slots 29A to D cause the gas entering the passages to expand, the expanding gas flowing upwardly in countercurrent relationship to the downwardly flowing liquid, and forcing the liquid against the surfaces of the tubes to produce a smooth uniform film thereon, thereby avoiding dry patches on the surfaces and preventing re-entrainment of liquid droplets into the gas-flow passages, which droplets give rise to arcing and other deleterious effects. The clean gas emerging at the upper end of the wet precipitator is exhausted through a hood H on whose surface moisture is condensed, the resultant liquid being discharged through an outlet at the bottom rim of the hood. Hood H preferably is formed with a parabolic curvature which serves to collect moisture without unduly impeding the flow of gas.

In order to enhance and broaden the versatility of the precipitator unit for product recovery, the precipitator is equipped with concentric manifold rings 30, each of which communicates with an array of standpipes or jets 31 aligned with the Venturi inlets. A supply vessel SV is provided containing a chemical compound or gas incorporating desired aerosols or a powder disperser. These chemical compounds, aerosols, or powder are pumped by a suitable air gas or liquid pump 32 into ring 30 and injected by the standpipes into the gas stream at the Venturi slot entrances. If necessary, the liquid compounds can be atomized through appropriate nozzles at the upper end of standpipes 31.

The atomized chemicl substances or aerosols, are designed to mix with effluent gases to effect a predetermined chemical reaction. Thus by-product is precipitated, in turn, into a liquid film of predetermined chemical characteristics on the collecting electrodes to cause a secondary desirable chemical reaction. For example, ammonia gas cannot be precipitated— However, if a mist of hydrochloric acid is injected through standpipes 31 into ammonia-laden gas passing through the passages, the atomized hydrochloric acid interacts with ammonia forming ammonia-hydrochloride which is solid substance and, therefore, can be precipitated.

Ammonia-hydrochloride, being solube in water, is then drained through conduit 15 into a suitable vessel to be marketed. It is also possible to meter the amount of hydrochloric acid so that the odors of ammonia and chlorine are neutralized. Thus, this precipitator may be successfully used in fertilizer plants — some of which are notorious for the emission of ammonia fumes having a deleterious effect on animal and plant life. Thus, using various chemical compositions in the liquid that washes the collecting electrodes, plus injections of various chemical compounds and aerosols, the precipitator can be used as a chemical plant in which these chemical compounds and aerosols are combined with precipitated matter forming valuable substances which can be easily recovered and marketed. If desired, the liquid could be recirculated through the precipitator to saturation point which reduces energy required to dehydrate the matter to be disposed of in a solid state.

When the contaminated stream to be treated includes non-precipitable chemical components such as sulfur dioxide, hydrogen chloride, hydrogen fluoride or any other gaseous contaminant, these non-precipitable contaminants may be removed by converting them into precipitable components. This is accomplished, for example, by injecting ammonia gas into the electrostatic passage, the gas being admitted at relatively high velocity.

The ammonia reacts with the gaseous contaminants to produce an ammonium salt which is solid matter and is therefore as capable of sustaining an electric charge as any other solid particle. Hence the reaction products may be electrostatically precipitated and carried away by the liquor films with fly ash or other particulate matter contained in the gas stream being treated. The dissolved ammonium salt may later be separated from the fly ash by filtration or by gravity in a settling basin. Then the ammonia may be chemically stripped from the salt solution for reuse as a reagent in the precipitator.

Thus, in an industrial chemical process in which sulfur dioxide appears in the output as a contaminant, atmospheric pollution can be avoided by injecting ammonia into the flue gas having a sulfur dioxide component, the reaction gives rise to ammonium sulfite which is then electrostatically precipitated as well as other particulates in the flue gas.

In a system in which a chemical reagent is injected into the input of an electrostatic precipitator to interact with a gaseous or chemical contaminant in the stream being processed, it is important that the reagent be uniformly dispersed in the stream and that it be intermingled therein with the non-precipitable component in proper proportions so that substantially all of the non-precipitable component is converted into percipitable matter. Also of importance is that the amount of reagent used for this purpose be no more than is necessary therefor.

In the event the arrangement is such as to disperse the reagent unevenly so that some of the non-precipitable contaminants in the moving stream remain untreated, then the untreated contaminants, since they do not precipitate, will pass into the atmosphere. On the other hand, if the reagent is uniformly dispersed but is in a volume insufficient to react with all of the non-precipitable contaminants, the same adverse effect will be obtained.

But should the volume of reagent be more than is required to fully treat the non-precipitable component in the stream, then while this component will be extracted from the stream, the excess reagent will pass into the atmosphere, and be wasted. When the reagent is ammonia or another moxious gas, its discharge into the atmosphere is highly objectionable.

REACTION CHAMBER

In some instances, it becomes necessary to introduce more than one reagent into the contaminated fluid stream in order to remove all non-precipitable components therefrom. In the inlet structure shown in FIG. 3, 4 and 5, three reagents are introduced by means of three separate manifold rings 34, 35 and 36 of substantially the same diameter. The rings are positioned one above the other in a reaction chamber 43 communicating with an annular Venturi inlet 37 defined by a central bowl 38 surrounded by an outer shell 39, the profiles of the bowl and shell being such as to create a Venturi throat. Bowl 38 is supported within shell 39 by a spider having arms 38A, 38B and 38C.

Each manifold ring is provided with a circular array of jet nozzles (34A, 35A, and 36A) for uniformly dispersing the reagent into the reaction chamber.

When chemical reaction requires secondary reagents to be introduced directly into the Venturi throat, nozzles 34A and 35A may be provided with a goose neck, so that the secondary reagents can be introduced into the Venturi throat at the desired level.

The contaminated stream passing upwardly through reaction chamber 43 and Venturi inlet 37 enter the annular passage 42 in a wet electrostatic precipitator. This passage is defined by concentric collector tubes 40 and 41 mounted on ledges at the top of shell 39 and bowl 38.

A discharge electrode structure 44 is supported within the annular passage to create an electrostatic field causing particles ionized thereby to migrate toward the water films on the walls lining the passage.

In reaction chamber 43, below the lowest ring 34, there is placed a multi-vane filter 45 serving to minimize tubulence and acting to uniformly distribute the incoming contaminated gas throughout the reaction chamber. The incoming gas enters directly into the reaction chamber through duct 46 at a point below filter 45 or the gas may be introduced laterally through a scroll or duct.

The axial position of each of rings 34, 35 and 36 relative to Venturi inlet 37 is manually adjustable so that the effect of the reagent introduced by the manifold on the non-precipitable contaminant may be varied to attain an optimum effect.

Adjustment of the manifold rings and proper positioning of the jet nozzles can be made in several ways. For the purpose of illustration, one arrangement is shown here. The manner in which the rings are vertically adjusted can best be seen in FIGS. 6, 7, 8 and 9.

Each manifold ring passes through the inclined slots of a set of cams, ring 34 cooperating with a set of cams 46, ring 35 with a set of cams 47 and ring 36 with a set of cams 48. The cams in each set are slidable along the track of a bed mounted on the shell 39 of the reaction chamber. Cam 46 is slidable on bed 49, cam 47 on bed 50 and cam 48 on bed 51.

Each cam in the set thereof is engaged by one end of a threaded shaft having a pinion thereon adjacent the other end which intermeshes with the teeth of a circular rack supported for movement on the exterior of a cylindrical casing 52 surrounding shell 39 of the inlet structure. Thus, cam 46 is threadly engaged by one end of a shaft 53 having a pinion 54 thereon intermeshing with a rack 55 supported on casing 52. Similarly, cam 47 cooperate with a shaft 56 having a pinion 57 thereon intermeshing with rack 58, and cam 48 cooperates with shaft 59 having a pinion 60 thereon cooperating with rack 61.

As best seen in FIGS. 7 and 8, in connection with the cam 48 on the upper set thereof, the end of shaft 59 threadably engages an internally threaded coupling head 48A on cam 48. Depending on the direction of rotation, cam 48 is caused to either move toward or away from shell 39 on bed 51. The manifold ring 36 passes through the enclosed slot 48B of cam 48 and is also confined within a vertical slot 48B on a plate attached to bed 51, so that the ring is only free to move up and down to an extent determined by the inclined cam slot 48B. Hence as the cam 48 moves away from shell 39, manifold ring 36 is forced upwardly, and as cam 48 moves toward shell 39, manifold ring 36 is lowered in slot 48C.

One of the shafts in each set thereof is provided with a handle as shown in FIGS. 6 and 9, where it will be seen that the lower set has a handle 62, the middle set a handle 63 and the upper set a handle 64. When the handle is turned, the pinion associated therewith causes the rack to rotate, which in turn, causes all other pinions in the related set to turn, thereby causing all of the associated cams to slide concurrently on their beds to adjust the position of the manifold.

One shaft in each set thereof, other than the shaft provided with the handle, is provided with a threaded follower having a pointer thereon which is shiftable along a fixed scale to indicate the extent to which the ring has been axially adjusted. Thus, the lower set has a follower 65 cooperating with a scale 66, the middle set has a follower 67 cooperating with a scale 68 and the upper set has a follower 69 cooperating with a scale 70.

Each reagent is fed into a respective manifold ring to intermingle with the stream passing through the inlet structure and to interact with a particular non-precipitable contaminant component in the stream. In order to supply no more reagent than is necessary to react fully with the existing concentration of the contaminant component, the amount of reagent introduced should be such as to provide a pure precipitator output, that is one having on significant amount of the non-precipitable component or the reagent.

Should insufficient reagent be supplied, then the output of the precipitator will contain untreated amounts of the non-precipitable component, but should the reagent supply be excessive, then excess reagent will appear in the output. An optimum condition can be obtained manually be adjusting the amount of reagent fed into the inlet structure and by adjusting the position of the manifold ring introducing the reagent therein.

But in some instances, particularly where the amount of non-precipitable component in the stream tends to change in the course of operation, it is desirable to automatically adjust the reagent supply so that the proper ratio of reagent to non-precipitable component exists at all times. This may be done by an electronic process controller system as shown in FIG. 10, wherein the concentration of the reagent in the inlet structure is sensed by a reagent sensor and that of the non-precipitable component by a sensor 72. The nature of these sensors depend on the chemistry of the gases to be sensed, hence if the reagent is ammonia and the contaminant is sulfur dioxide, sensors specifically adapted to sense these gases must be used to produce an electrical analog signal proportional to the gas being sensed. Such sensors are well known in chemical process engineering systems and are commercially available.

The signals from sensors 71 and 72 are applied to a ratio detector 73 to provide a ratio signal depending on the relative amounts of the two variables sensed. The ratio signal is compared in an electronic controller 74 against a predetermined set point signal to provide a control signal which is applied to a valve 75 in the reagent supply line to adjust the amount of reagent fed into the inlet structure to a degree affording the desired ratio. In other words, if the amount of reagent relative to that of the non-precipitable component deviates in either direction from the optimum level at which all of the component is rendered precipitable, then the amount of reagent is varied to a degree re-establishing the optimum condition. In practice, one may also introduce catalysts into the reaction chamber whenever the chemical reaction involved requires a catalyst.

The proper chemical reaction in the Venturi may also depend on the velocity of gas passing through the latter, as well as relative positioning of the jets in relation to each other and to the Venturi. To provide this function, another electronic process control system is introduced which is activated by the pitot tube or velometer placed in the gas stream. Electric motors replace manual cranks 62, 63 and 64. The gas velocity readings fed into a process control system will automatically position the jets in the Venturi. Thus the system will be automatically and constantly adjusted not only by the volume and the timing of reagents required, but also by velocity of the gasses passing through the Venturi.

WATER DISTRIBUTOR

In a wet precipitator, the efficiency of its operation depends, to a large extent, on the uniformity of the water films formed on the walls of the collector tubes, for if the liquid distributors mounted on the top of the collector tubes do not provide a liquid film evenly dispersed on the walls, splashing may occur at some point which may result in a high-voltage short with subsequent loss of electrostatic field. At other points, dry spots may appear on the surface of the collecting electrodes, impairing the precipitator's action.

Thus in the multi-concentric precipitator shown in FIG. 1, the collector tubes 10 and 11 are so positioned in the assembly that in the case of collector tube 10, a water film is formed only on the outer surface of the tube, whereas in the case of tube 11, which cooperates both with collector tube 10 and collector tube 12 to define concentric annular passages, muct have water films on both walls thereof.

Referring now to FIGS. 11 and 12, there is shown one preferred form of water distributor adapted to create water films on both walls of a hollow collector tube having an inner cylinder 76 and an outer cylinder 77. Received on the collector tube and seated on top of cylinders 76 and 77 is a water distributor including a hollow ring 78 having a semi-circular cross-section and provided with feet 79 and 80 which extend into the space between cylinders 76 and 77 and lie thereagainst.

The interior of water distributor ring 78 is divided by partitions 81 and 82 into an annular main tank 83 and a sub-tank 84 therebelow. The sub-tank 84 is coupled by way of pipe 85 passing between the cylinders 76 and 77 of the collector tube to a suitable water supply source. The sub-tank communicates with main tank 83 through a circular series of inclined openings 86 whereby the main tank is filled by inclined water sprays which cause the water in the main tank to swirl.

Liquid from main tank 83 is fed to the exterior of distributor ring 78 by way of a circular series of inclined jet openings 87, which terminate in a circular groove 88 running around the top of the distributor. Fitted within this groove in the spaces between openings 87, are blocks 89. These blocks serve to support a deflector ring 90 above the distributor ring; the deflector ring functions to divide the liquid spray from the jet openings into two substantially equal liquid streams, one flowing down the outer surface of collector tube 76 and the other down the outer surface of collector tube 77.

Deflector ring 90 is provided on its underside with a concave channel 91 which faces the rounded top surface of distributor ring 78. Channel 91 is bordered by an inner bank 92 and an outer bank 93. Bank 92, which is raised above the left side of liquid distributor 78, defines therewith a liquid outlet $LO_1$ with respect to the outer surface of collector tube 78. Bank 93 which is raised above the right side of liquid distributor 78, defines therewith a liquid outlet $LO_2$ with respect to the outer surface of collector tube 77.

The liquid stream directed upwardly by the jets 87 of the water distributor strike the curved surface of channel 91 and are deflected thereby toward both banks for downward flow on the collector tube surfaces.

Because of the circular motion of the liquid in the main tank 83 of the water distributor and the inclination of jets 87 emitting the liquid, the resultant liquid strams on the concave channel 91 are caused to rotate in overlapping patterns to produce a uniform film. However, the centrifugal force generated by the circular motion of the liquid, tends to direct the liquid outwardly toward bank 93 and away from bank 92 of the channel.

To correct the effect of centrifugal force and to equalize liquid flow down the surfaces of collector tubes 76 and 77, jets 87 are so inclined, as shown in FIG. 7, as to direct the stream somewhat off-center, toward bank 92. Also, the outlet $LO_1$ is made somewhat larger than outlet $LO_2$, this being done by raising bank 92 higher than bank 93, so that the latter outlet is more restricted to compensate for the tendency of the liquid to move in the direction of this outlet. In this way, the flow from the outlets is substantially balanced.

MODIFICATIONS

Referring now to FIGS. 13 and 14, there is shown another embodiment of a wet precipitator in accordance with the invention. This arrangement functions in essentially the same manner as that shown in FIG. 1, the difference lying in the fact that the channels between collectors are not annular in cross-section, but rectangular, the collectors being planar rather than tubular.

The structure shown in FIGS. 13 and 14 is in effect, a rectangular projection of the tubular arrangement shown in the previous Figures, this projection being developed by a longitudinal cut in the tubes, making it possible to flatten out the cylindrical surfaces, so that instead of inner and outer double-walled tubes (10 and 14) we now have end plates 95 and 96, whose inside surfaces are provided with liquid films by suitable water distributors which may be fed by pipes going between the walls of the plates. Instead of concentrical intermediate tubes (11, 12 and 13), we now have intermediate plates 97, 98 and 99, which are in parallel arrangement with end plates 95 and 96, to define rectangular channels I, II, III and IV, in which there are supported discharge electrodes 100, 101, 102 and 103, respectively. Contaminated gas is fed into these channels through venture inlets 104, as shown in FIG. 14.

In practice, when one desires to oxidize particulate matter or gases to produce a reaction product that is precipitable in the electrostatic precipitator, this may be accomplished by generating ozone. Ozone is best generated by corona discharge, this being accomplished by means of preionization needles or sharp spikes attached to the lower extremities of the discharge electrodes.

The resultant corona discharge in the pre-ionization zone, generates ozone which reacts, say, with a nitrogen oxide contaminant to produce a nitric acid mist which is readily precipitated electrostatically.

The injection of chemicals in accordance with the invention, is not only to obtain a chemical reaction, but may also be used for odor elimination. In some instances, the nature of the contaminant may be such that even though the contaminant is almost entirely removed in the precipitator, the slight residue which is discharged into the atmosphere, may have a highly offensive odor. Odor elimination may be effected by injecting activated carbon powder or other odor-inhibiting material into the reaction chamber or by placement of a catalyzer ring or in the vicinity of the Venturi to provide the necessary reaction. This catalytic ring CR as shown in FIG. 5 may be made of porous or sintered aluminum or of platinum or of any other known catalytic material.

While there have been shown and described, preferred embodiments of a wet electrostatic precipitator for removing gaseous and particular contaminants in accordance with the invention, it will be appreciated that many changes and modifications may be made therein without, however, departing from the essential spirit of the invention.

I claim:
1. An electrostatic wet precipitator adapted to purify a gaseous stream containing gaseous as well as particulate contaminants before the stream is discharged into the atmosphere, said precipitator comprising:
   a. concentrically-arranged collector tubes defining at least one vertically-disposed annular gas passage having an inlet at the lower end of the tubes and an outlet at the upper end thereof, said outlet leading to the atmosphere, b. means to produce downwardly-flowing films of liquid on the complementary surfaces of adjacent tubes which line said passage thereby to form liquid collectors, c. a discharge-electrode structure disposed within said passage in spaced relation to said liquid collectors;

d. inlet means including a reaction chamber disposed below said collector tubes followed by a Venturi opening to feed said contaminated gaseous stream at a relatively high velocity into the inlet of each passage to produce an expanding gas which flows upwardly through said passage in counter-current relationship to said liquid films to force said films against said surfaces to maintain the uniformity thereof;

e. means to apply a high voltage between said discharge electrode structure and said liquid collectors to ionize the particulate contaminants in the gaseous stream flowing through said passage to cause migration of said particulate contaminants toward said liquid collectors and thereby purify the stream;

f. means in said reaction chamber to disperse reagents therein to react with said gaseous contaminant to produce reaction products in particulate form which are ionized and precipitated in said passage along with said particulate contaminants in said stream, g. adjustable means to optimize the amount of reagents dispersed in said chamber relative to the existing concentration of the gaseous contaminant to an extent whereby substantially all of said gaseous contaminant is caused to react with said reagents and the stream discharged into the atmosphere through said outlet is substantially free both of said reagents or said gaseous contaminant, and h. means separate from said reaction chamber to drain said liquid collectors and thereby recover said reaction products.

2. A precipitator as set forth in claim 1, wherein said collector tubes are of double-walled construction to provide an interior space through which liquid is fed to the top of the tubes to a distributor serving to flow the liquid downwardly on the surfaces of the tubes.

3. A precipitator as set forth in claim 1, further including a hood at the top thereof, said hood having a parabolic shape whereby the clean gas impinges on the surface thereof, causing moisture therein to condense, thereby avoiding the presence of vapor in the gas discharged from the precipitator.

4. A precipitator as set forth in claim 1, further including a process controller having means to sense the concentration of reagent in said reaction chamber and to sense the amount of non-precipitable contaminant in said chamber, the resultant indications being supplied to a ratio detector providing a ratio signal depending on the relative amount of the variables sensed, the ratio signal being compared in an electronic controller against a set point to provide a control signal applied to a final control element in the reagent supply line to adjust the amount of reagent fed into the chamber to a degree affording the desired ratio.

5. A precipitator as set forth in claim 1, further including means to disperse a catalyst in said reaction chamber to promote the reaction between said reagent and said contaminant therein.

6. A precipitator as set forth in claim 1, further including means to disperse activated charcoal powder in said reaction chamber to remove odors from the contaminant.

7. A precipitator as set forth in claim 1, wherein said discharge electrodes are provided with preionizing needles at the lower ends thereof to produce corona discharges generating ozone to oxidize contaminants.

8. A precipitator as set forth in claim 1, further including means in said reaction chamber to uniformly distribute the incoming contaminated stream throughout said chamber.

9. A precipitator as set forth in claim 1, wherein said gas passages all have the same radial dimensions, and wherein the high voltage applied to each of the electrode structures in said passages is at the same amplitude level for each structure.

10. A precipitator as set forth in claim 9, wherein all of the electrode structures are supported from a common spider.

11. A precipitator as set forth in claim 1, wherein some of the gas passages have the same predetermined radial dimension and other passages have a larger radial dimension, the high voltage applied to each of the electrode structures being at relative level determined by the radial dimensions thereof.

12. A precipitator as set forth in claim 11, wherein all of the electrodes in passages having the same radial dimension being supported by a common spider, the other electrodes being supported by means electrically isolated from the spider.

13. A precipitator as set forth in claim 1, wherein said means in said reaction chamber to disperse reagents therein includes one or more manifold rings having an array of jet nozzles for spraying appropriate reagents into the chamber.

14. A precipitator as set forth in claim 13, further including means to adjust the axial position of said rings relative to said Venturi opening to optimize the reaction with the gaseous or chemical contaminants in the incoming stream.

15. A precipitor as set forth in claim 13, further including a ring of catalytic material in said reaction chamber.

16. A precipitator as set forth in claim 1, wherein said means to produce downwardly-flowing films is constituted by a water distributor ring mounted on top of each collector tube, said ring having a series of jet openings therein causing the liquid to project upwardly, and a deflector ring raised above the distributor ring to receive the upwardly projected liquid and to direct the liquid down the surface of the associated tube, the jets producing a swirling liquid motion in the deflector.

17. A precipitator as set forth in claim 16, wherein said deflector ring is provided with a concave channel bordered by inner and outer banks to define, with respect to the distributor, an inner outlet for passing the liquid down the inner surface of the collector tube and an outer outlet for passing liquid down the outer surface of the collector tube, the outer outlet being relatively small to compensate for centrifugal forces.

* * * * *

UNITED STATES PATENT OFFICE
CERTIFICATE OF CORRECTION

Patent No. 3,856,476   Dated December 24, 1974

Inventor(s) Alexander P. DeSeversky

It is certified that error appears in the above-identified patent and that said Letters Patent are hereby corrected as shown below:

In the Title "Precipitation" should have read
-- Precipitator --

In the Abstract, last line "interation" should have read
-- interaction --
Col. 1, line 3 "Precipitation" should have read --Precipitator --
Col. 1, line 28 "furnance" should have -- furnace --
Col. 6, line 65 "chemicl" should have read -- chemical --
Col. 8, line 15 "moxious" should have read -- noxious --
Col. 8, line 52 "tubulence" should have read -- turbulence --
Col. 9, line 60 "on" should have read -- no --
Col. 11, line 1 "muct" should have read -- must --
Col. 11, line 49 "strams" should have read -- streams --
Claim 15, line 1 "precipitor" should have read -- precipitator --

Signed and sealed this 8th day of April 1975.

(SEAL)
Attest:

RUTH C. MASON
Attesting Officer

C. MARSHALL DANN
Commissioner of Patents
and Trademarks